Oct. 5, 1926.　　　T. P. CAMPBELL　　　1,601,938
APPARATUS FOR THE PURIFICATION OF ZINC SOLUTIONS
Original Filed Sept. 8, 1925
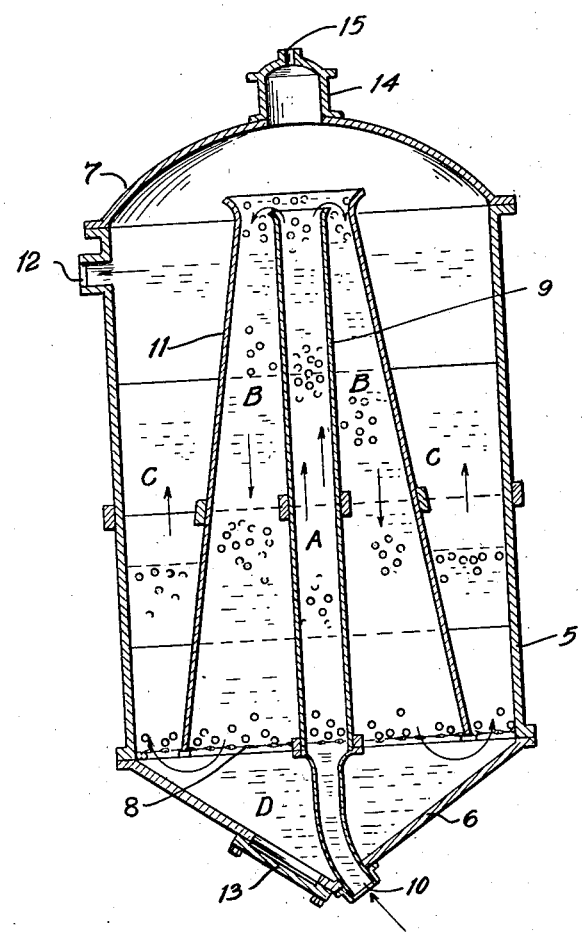
Inventor
Thomas P. Campbell.
By　J. J. O'Brien
　　　　　　　　Attorney Patented Oct. 5, 1926.

1,601,938

UNITED STATES PATENT OFFICE.

THOMAS P. CAMPBELL, OF DENVER, COLORADO.

APPARATUS FOR THE PURIFICATION OF ZINC SOLUTIONS.

Original application filed September 8, 1925, Serial No. 55,022. Divided and this application filed February 16, 1926. Serial No. 88,571.

This invention relates to an apparatus for use in carrying out a process for the purification of zinc solutions and is a division of application 55022 filed September 8, 1925, now Patent 1,587,695.

In carrying out a series of experiments for the purpose of discovering a practical method by means of which zinc solutions may be sufficiently purified to permit the zinc to be deposited electrolytically. I found that successful results could be obtained by permitting the impure zinc solution to percolate through chambers or compartments containing loosely packed metallic zinc particles such as zinc shot. This method is described and claimed in a copending application of even date herewith.

In carrying out this process, I found that the best results were obtained if the solution was first made to percolate upwardly through a compartment containing zinc shot at a velocity sufficient to carry along the deposited metal, which would otherwise adhere to the zinc shot and cause clogging. From this compartment the solution and the entrained precipitated metals pass downwardly through a second compartment also containing zinc shot. This compartment is of a greater cross-sectional area than the first compartment so that the velocity of the solution is correspondingly lower, but high enough to prevent clogging. This second compartment opens at its bottom into a settling chamber from which it is separated by a wire screen of quarter mesh, which supports the zinc shot. This settling chamber is also connected at its top with a third compartment of larger area than the second. This compartment also contains zinc shot, carried by the wire screen. The third compartment is so much greater in cross-sectional area that the velocity of flow of the solution is low enough to permit settling. The apparatus, or as I have termed it, the tower, is constructed on the theory that the solution is first to percolate upwardly through a compartment of comparatively small cross-sectional area, and filled with zinc shot, at a velocity that would sweep away and carry along the precipitated metals which would then pass with the solution into a second compartment of greater area. As the flow in the second compartment is downwardly, it is evident that the velocity would only have to be great enough to prevent clogging. The precipitation is completed when the solution has passed through the two compartments and it is therefore passed into a settling chamber where the precipitated metals are removed and from whence the solution is caused to flow upwardly through a still larger compartment containing only a sufficient amount of zinc shot to prevent contamination, due to slimes carried up from the settling chamber.

The apparatus actually employed by me, and which is illustrative of the type of apparatus required, is shown on the accompanying drawing in which the single view is a vertical section.

The apparatus consists of a cylindrical member 5 of cast-iron, when used with ammoniacal solution, or of lead lined cast-iron or other acid resistant material when acid solutions are employed. The bottom of the cylinder is closed by a conical cap 6, while a cap 7, preferably spherical, closes the upper end. A wire screen 8 extends across the lower end of member 5. A cylindrical tubular member 9 projects upwardly centrally of member 5 and extends downwardly, opening through the cap 6 at 10. The cylindrical member 9 constitutes the wall of the compartment A, which is filled with zinc shot. A conical member 11 of sheet metal surrounds member 9 and rests upon the wire screen 8. The space between the outside of member 9, the inside of member 11 and the top of the screen 8 is designated as chamber B and is also filled with shot that rests upon the screen 8. Member 11 divides the space between the central member 9 and the inner surface of member 5 into two compartments B and C. The cross-sectional area of compartment B increases from top to bottom while the cross-sectional area of compartment C increases from bottom to top. Owing to the larger diameter of compartment C, it has a much greater area than compartment B. The cylinder 5 has an exit-opening 12 near its top, and a manhole 13 is provided in the cap 6 for cleaning purposes.

The solution to be purified is passed in through the opening 10 and percolates upwardly through the zinc shot in chamber A. The reaction between the impure zinc solution and the zinc shot causes hydrogen gas to be liberated. This gas forms bubbles that pass upwardly through the interstices of the shot and helps to keep them clean. This gas escapes through an opening 15 in the dome 14. The results desired may be obtained by specifically different means, but I consider it quite essential that the apparatus should conform to the broad idea present in the apparatus explained above, and which will now be specifically defined in the appended claims.

Having now described my invention, what I claim as new is:—

1. An apparatus for use in the purification of zinc solutions, which comprises a tank whose interior is divided into a series of separate interconnected compartments of successively greater cross-sectional areas, the compartment having the smallest cross-sectional area being provided with an inlet, and the compartment having the largest cross-sectional area being provided with an outlet.

2. An apparatus for use in the purification of zinc solutions, which comprises a tank whose interior is divided into a series of separate interconnected compartments of successively greater cross-sectional areas, the compartment having the smallest cross-sectional area being provided with an inlet, and the compartment having the largest cross-sectional area being provided with an outlet, the last two compartments being in communication with a settling chamber formed by a foraminated partition extending across the tank near the bottom thereof.

3. An apparatus for use in the purification of zinc solutions, which comprises a cylindrical member provided with end closures, a foraminated diaphragm extending transversely of said member and separating the same into two chambers, a tubular member located substantially centrally of the cylinder, said tubular member having an inlet at the bottom of the apparatus, a conical member of sheet metal surrounding the tubular member and dividing the space between the tubular member and the inside wall of the cylindrical member into two compartments, said conical member having its lower enlarged end resting on the foraminated diaphragm.

In testimony whereof I affix my signature.

THOMAS P. CAMPBELL.